US 6,965,413 B2

(12) United States Patent
Wada

(10) Patent No.: US 6,965,413 B2
(45) Date of Patent: Nov. 15, 2005

(54) TELEPHONE AND CAMERA WITH A BIDIRECTIONALLY ROTATABLE LID HAVING A DISPLAY MOUNTED THEREON

(75) Inventor: Jo Wada, Tokyo (JP)

(73) Assignee: Sony Corporation, Tokyo (JP)

( * ) Notice: Subject to any disclaimer, the term of this patent is extended or adjusted under 35 U.S.C. 154(b) by 779 days.

(21) Appl. No.: 09/852,864

(22) Filed: May 10, 2001

(65) Prior Publication Data

US 2002/0051060 A1    May 2, 2002

(30) Foreign Application Priority Data

May 12, 2000    (JP)    ............................ P2000-139549

(51) Int. Cl.⁷ ...................... H04N 5/225; H04N 5/222; H04N 7/14; H04M 1/00
(52) U.S. Cl. .............. 348/376; 348/333.06; 348/14.02; 455/556.1; 455/575.3
(58) Field of Search ........................... 455/90.3, 556.1, 455/566, 575.3, 575.03; 348/14.01, 14.02, 348/14.03, 14.04, 14.05, 14.07, 14.12, 14.13, 348/333.06, 376; D14/138

(56) References Cited

U.S. PATENT DOCUMENTS

| | | | | |
|---|---|---|---|---|
| 5,491,507 A | * | 2/1996 | Umezawa et al. | 348/14.02 |
| 6,009,336 A | * | 12/1999 | Harris et al. | 455/566 |
| 6,069,648 A | * | 5/2000 | Suso et al. | 348/14.02 |
| 6,549,789 B1 | * | 4/2003 | Kfoury | 455/550.1 |
| 6,658,272 B1 | * | 12/2003 | Lenchik et al. | 345/164 |
| 6,690,417 B1 | * | 2/2004 | Yoshida et al. | 348/231.1 |
| 6,697,117 B1 | * | 2/2004 | Park | 348/373 |
| 6,751,473 B1 | * | 6/2004 | Goyal et al. | 455/556.1 |
| 2001/0004269 A1 | * | 6/2001 | Shibata et al. | 348/333.06 |

\* cited by examiner

Primary Examiner—Wendy R. Garber
Assistant Examiner—Justin Misleh
(74) Attorney, Agent, or Firm—Jay H. Maioli

(57) ABSTRACT

A foldable portable terminal unit containing a picture taking device capable of transmitting both image and voice. The unit enables users to see the display when taking pictures of themselves, as well as taking pictures of other objects. The lid portion (3) folds and rotates with respect to the case main body (2) of the portable terminal unit. The display (6) is provided in the lid portion (3) and rotates with respect to the picture taking device (11) fixed on the rear face or the side face of the case main body (2), corresponding to the state of taking a picture so as to enable monitoring.

9 Claims, 6 Drawing Sheets

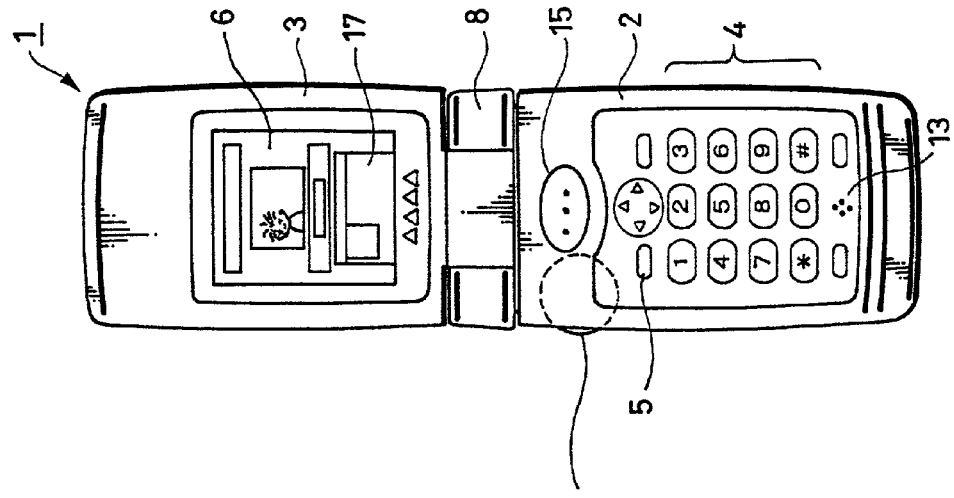
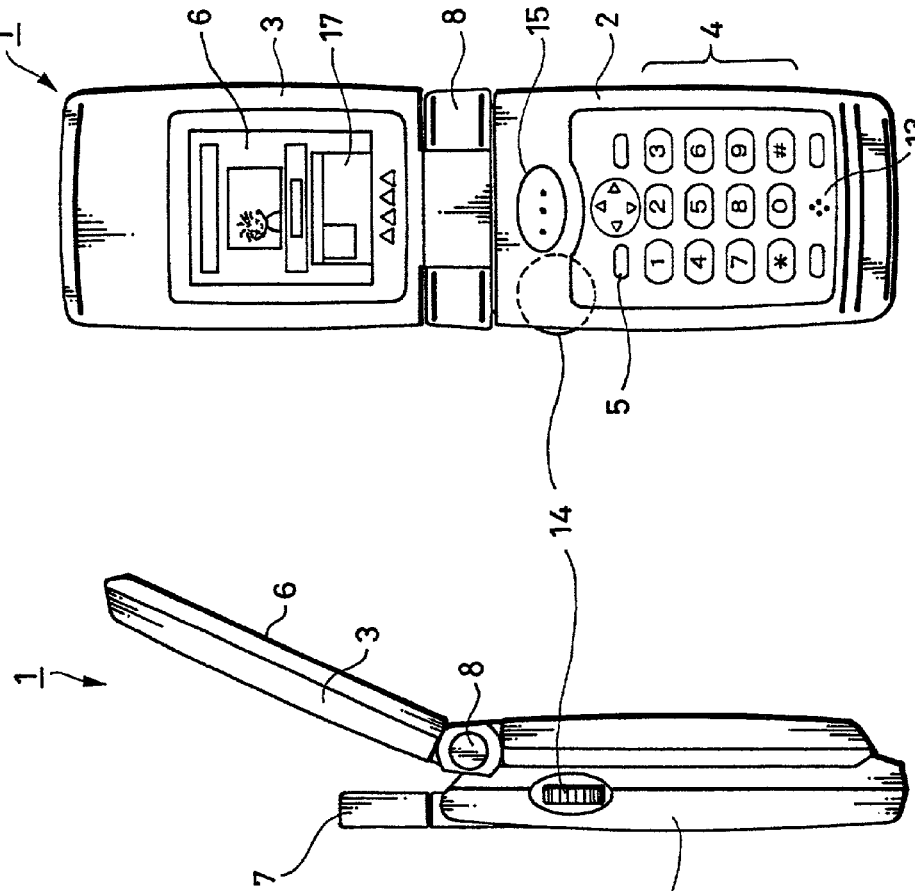
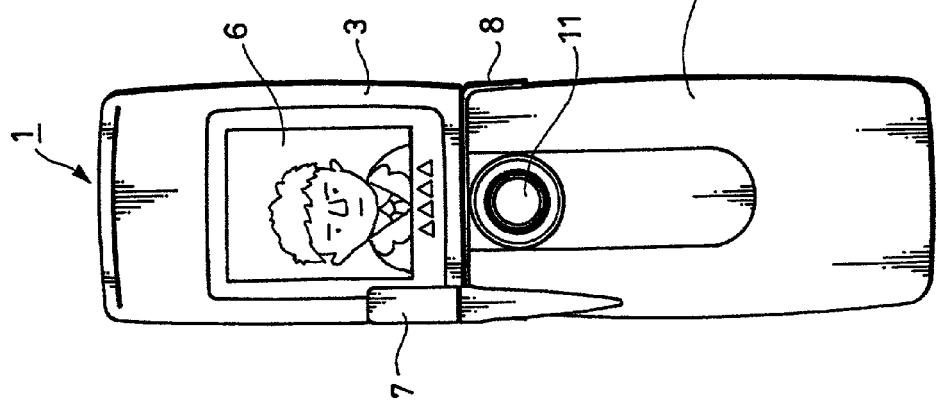

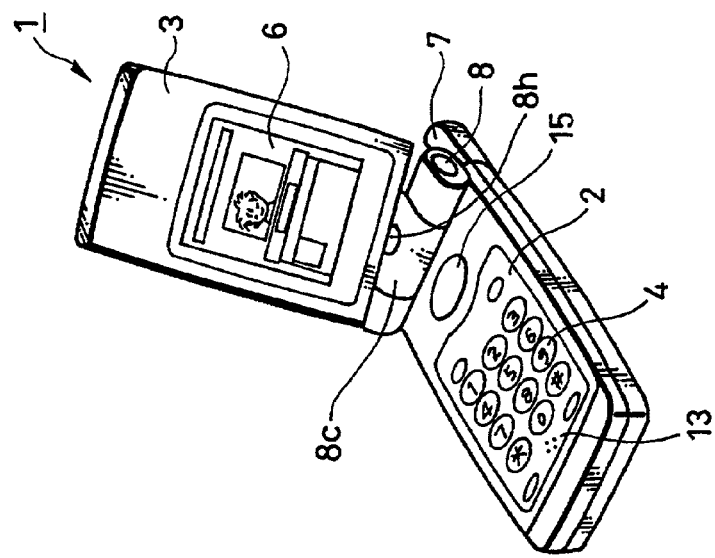
FIG. 3C
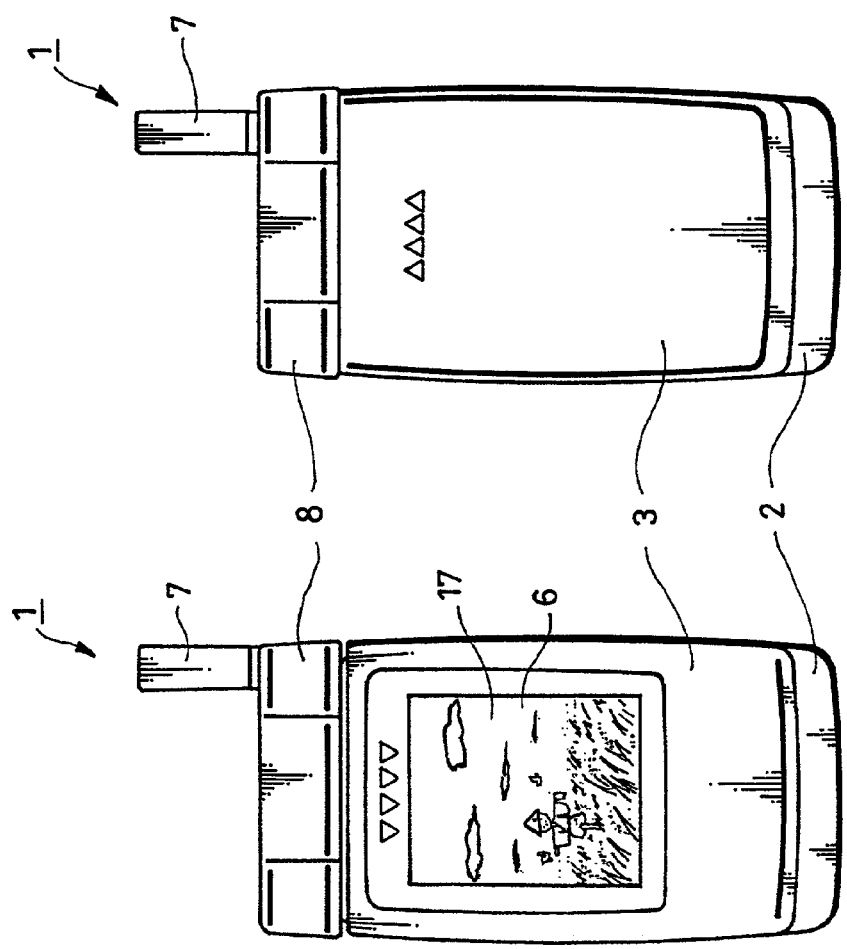
FIG. 3B
FIG. 3A

F I G. 5A
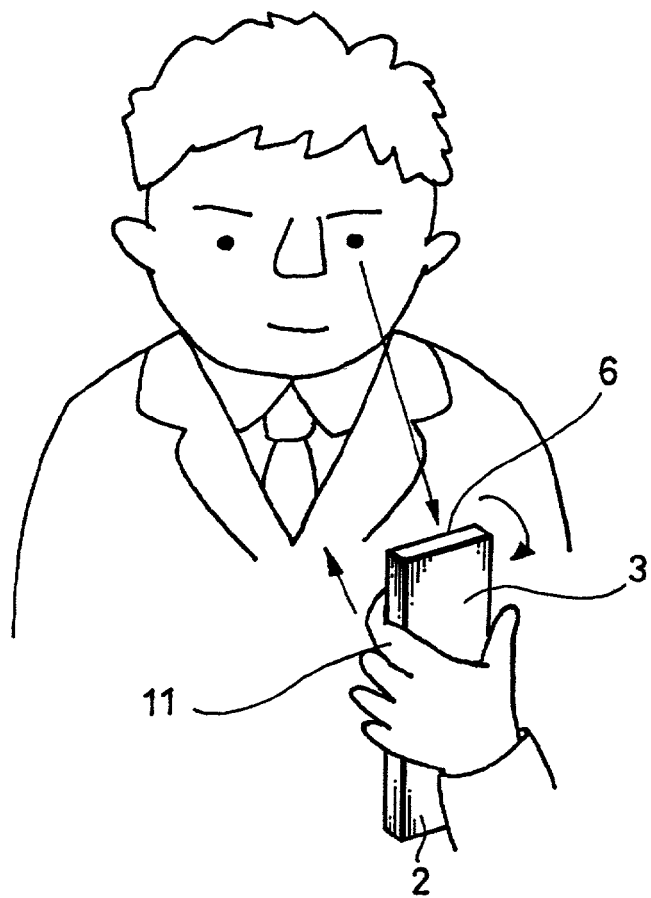
F I G. 5B
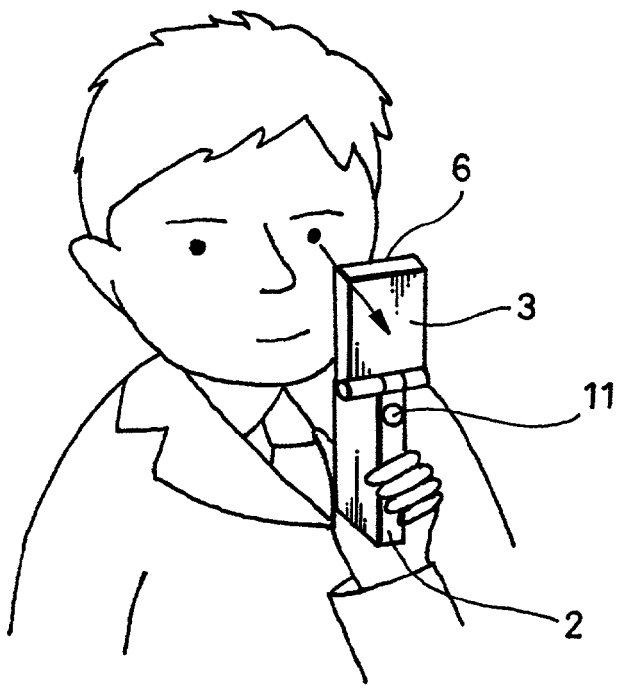

TELEPHONE AND CAMERA WITH A BIDIRECTIONALLY ROTATABLE LID HAVING A DISPLAY MOUNTED THEREON

BACKGROUND OF THE INVENTION

1. Field of the Invention

The present invention relates to a portable terminal unit for a personal digital assistants (PDA), portable phone or the like, and more particularly to a portable terminal unit in which a display means thereof is rotatable and a picture taking means is disposed on a case main body thereof.

2. Description of the Related Art

Since before, a portable terminal unit capable of transmitting a picture taken with a picture taking camera through the same portable terminal unit to other terminal units via E-mail or the like has been well known.

FIG. 1 shows the configuration of the unit for transmitting a picture taken with the picture taking camera from the aforementioned portable terminal unit to other terminal units. In the same Figure, the foldable mobile phone 1 comprises a case main body 2 (lower case) and a lid portion 3 (upper case).

A ten key 4, a mail key 5 capable of switching an E-mail menu by single action or the like are disposed as various kinds of the keys on a main face of the case main body 2 of the mobile phone 1 and a display device 6 such as liquid crystal display (LCD) and an antenna 7 are disposed on the main face of the lid portion 3.

By folding the case main body 2 and the lid portion 3 through a hinge 8, reduction of the size of the mobile phone is achieved.

Reference numeral 10 denotes a picture-taking case body comprising a picture taking camera 11 capable of taking picture of data such as a picture desired to be transmitted to other terminal units, a display device 12 such as LCD, transmission function and receiving function. By connecting a connection code 9 integrated with this picture-taking case body 10 to a mobile phone 1, a picture taken with the picture taking camera 11 can be transmitted easily to other terminal units through E-mail.

In case of the portable terminal unit having the structure described above, the picture taking case body 10 has to be carried with the mobile phone 1. Therefore, it is meaningless if only the mobile phone is reduced in size.

Further, when taking picture with the picture taking camera 11, the picture taking camera has to be connected to the mobile phone 1, which make user feel troublesome.

Further, when taking picture of an object with the picture taking camera 11 of the picture-taking case body 10 directed to the object, there is not any problem if user takes picture of himself or herself while watching a screen monitor on the display device 12. However, because an opening of the picture taking camera 11 is located on the side of the display device 12 of the picture taking case body 10, if the picture taking camera 11 is directed to outside, user cannot monitor the screen of the display device 12.

SUMMARY OF THE INVENTION

The present invention has been achieved to solve the above described problem and an object of the present invention is to provide a mobile phone (portable terminal unit) eliminating the necessity of carrying any picture taking case body so as to achieve reduction of the size of the mobile phone and allowing user to monitor a display screen when taking picture of himself or herself as well as when taking picture of an outside object.

To achieve the above object, according to an aspect of the present invention, there is provided a portable terminal unit comprised of a lid portion foldable with respect to a case main body. The lid portion is installed on the case main body rotatably and includes a display means, and the case main body has a picture taking means.

According to another aspect of the present invention, the picture taking means is disposed on the rear face of a flat portion of the case main body.

According to still another aspect of the present invention, the picture taking means is disposed on the side face of the case main body.

According to the portable terminal unit of the present invention, reduction of the size and weight thereof is achieved and convenience in taking pictures with the picture taking means is secured.

BRIEF DESCRIPTION OF THE DRAWINGS

FIG. 2 shows a rear view, a side view and a front view of the portable terminal unit of the present invention;

FIG. 3 is an explanatory diagram about a rotation condition of a lid portion of the portable terminal unit of the present invention;

FIG. 5 is an explanatory diagram about use of the portable terminal unit of the present invention.

DETAILED DESCRIPTION OF THE PREFERRED EMBODIMENTS

Hereinafter, as an example of the portable terminal unit of the present invention, a mobile phone will be described in detail with reference to FIGS. 2 to 6.

Figure 1:
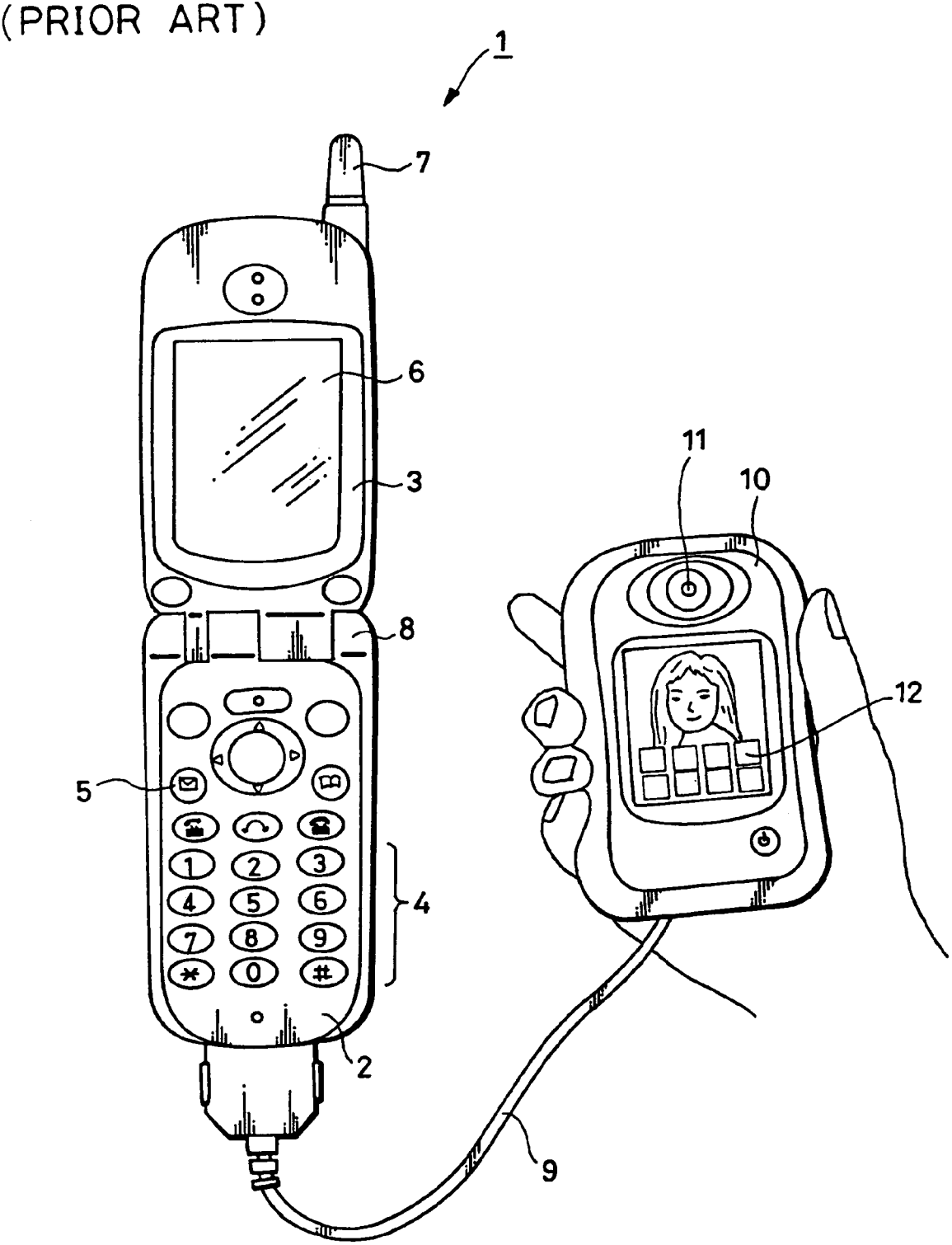
FIG. 1 is a configuration drawing of the portable terminal unit.

FIGS. 2A to 2C show a rear view, a side view and a front view of the mobile phone of the present invention and the identical reference numerals denote corresponding components in FIG. 1.

FIG. 2A is a rear view showing a condition in which a lid portion 3 of the portable terminal unit of the present invention is opened, FIG. 2B is a side view of the same and FIG. 2C is a front view of the same.

In FIGS. 2A to 2C, a case main body 2 contains transmission/reception circuit and other circuits enabling exchange of E-mail, the Internet communication, distribution of image signal and the like, these circuits being required for a mobile phone 1. As shown in the front view, the case main body 2 has a ten key 4, mail key 5, speaker 13, receiver 15 and the like, which operates the respective circuits. As shown in the rear view of the case main body 2, an antenna 7 is provided on the rear face and an opening of a picture-taking camera 11 is provided in the vicinity of a hinge 8 at the top of the rear face of the case main body 2.

As shown in the side view of FIG. 2B, a jog dial 14 is provided on a left side face of the case main body 2 to select various application functions and the like on a display screen 17 of a display device 6. The jog dial is an operating means which can be rotated or pressed. By rotating the jog dial, menu item displayed on the display device 6 is scrolled so as to select one item. Pressing it determines a selection of the menu item. Although this jog dial may be disposed on the same plane as a plane in which the ten key 4 is disposed, if it is disposed on the side face of the case main body 2, as described later, the picture-taking camera 11 disposed on the rear face of the case main body 2 can take picture of an object with the mobile phone 1 being folded, which is very convenient.

The lid portion 3 is foldable freely through a hinge portion 8 with respect to the case main body 2 and the display device 6 such as an LCD is provided inside the lid portion 3. Thus, if the lid portion 3 is folded in an ordinary state (a state in which the display device 6 faces toward a folding direction), as shown in FIG. 3B, the display device 6 is incorporated in the lid portion 3. As a result, reduction of the size of the mobile phone 1 is achieved.

Figure 4:
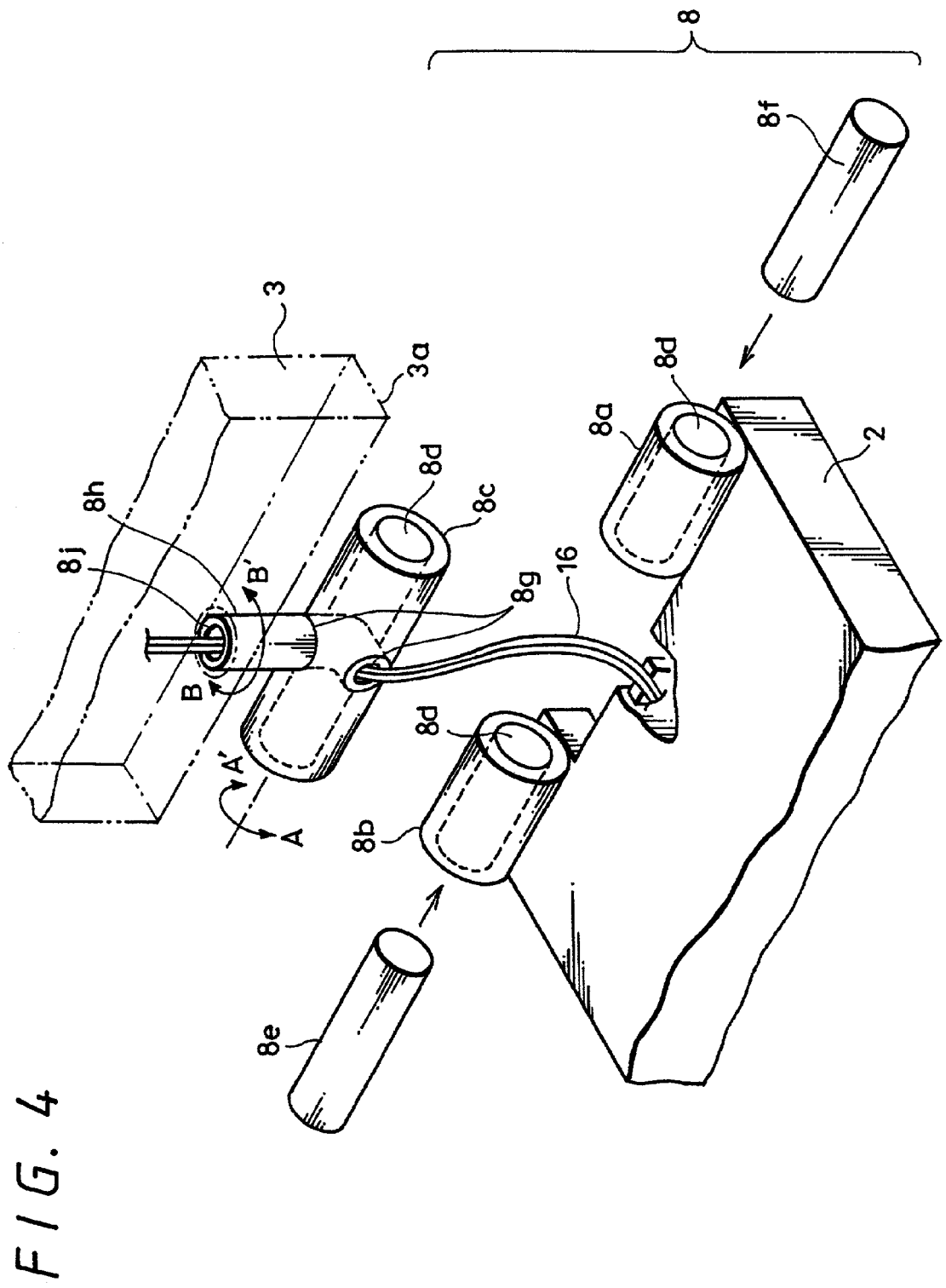
FIG. 4 is an exploded perspective view of a hinge of the portable terminal unit of the present invention.

FIG. 4 shows an exploded perspective view of the hinge 8 of the mobile phone of this embodiment. The hinge 8 is comprised of two right/left bearings 8a, 8b molded integrally with the case main body 2 using synthetic resin with a central bearing 8c provided between the right and left bearings. Right and left shafts 8e, 8f are inserted into through holes 8d bored in the respective bearings 8a, 8b, 8c. The central bearing 8c is rotatable with respect to the right and left shafts 8e, 8f as indicated by an arrow A–A'.

An L-shaped through hole 8g is made substantially at a central position of the central bearing 8c such that it intersects a through hole 8d. A pipe 8h is inserted into the L-shaped through hole 8g in an upper portion. This pipe 8h is rotatable with respect to the through hole 8g in the direction of an arrow B–B'. In this case, an end of the pipe 8h is fixed to a bottom face 3a of the lid portion 3.

It is also permissible to erect the pipe 8h so as to be fixed to the central bearing 8C and install a front end of the pipe 8h inserted into a through hole 8j made in the bottom portion 3a of the lid portion 3 such that it is capable of pivoting in the direction of an arrow B–B' with respect to the lid portion 3.

When the lid portion 3 is installed pivotally in the direction of the arrow B–B', although not shown in FIG. 3, the lid portion 3 is rotated with click motion with respect to balls buried in the through holes 8g or 8j at every predetermined angle. As a result, the lid portion 3 is capable of being rotated by 180° relative to the case main body 2.

Wires 16 are communicated from the case main body 2 to the lid portion 3 through the through hole 8g in the central bearing 8c and the pipe 8h.

FIG. 3C indicates a state in which the lid portion 3 is being rotated in a counterclockwise direction with respect to the pipe 8h via the aforementioned hinge 8. FIG. 3A shows a state in which the display device 6 provided inside the lid portion 3 is turned to the front side of the case main body 2, the display device 6 completely rotated at an angle of 180°, and then the lid portion 3 is folded.

Although in case of FIG. 3A, the up-down direction of the display screen 17 of the display device 6 is inverted as compared to a case of FIG. 3C, it is so constructed that a proper screen 17 can be seen in a use condition of FIG. 3A by inverting the up-down direction of the screen 17 electrically.

Figure 6:
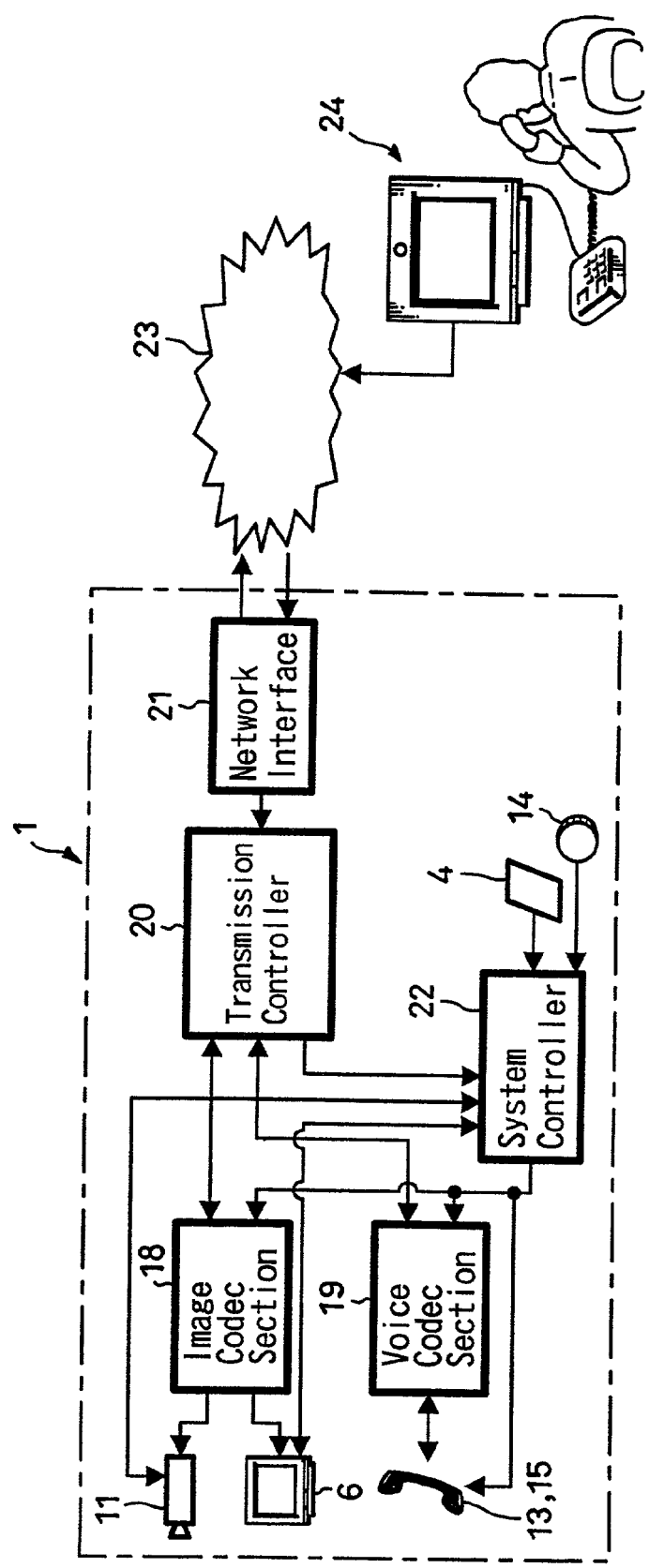
FIG. 6 is an explanatory diagram of picture distribution model by the portable terminal unit of the present invention.

FIG. 6 shows a model of a TV phone which distributes pictures using the above described mobile phone 1 which is the portable terminal unit of the present invention through a transmission path 23 such as a narrow-band or wide-band ISDN network.

Image inputted through a picture taking camera 11 such as CCD disposed on a rear side of the case main body 2 is encoded by an animation or static image codec section 18 and stored in a memory (not shown) in the codec section 18. Encoded image stored is transmitted to the transmission path 23 through a transmission controller 20 and a network interface 21 via wire or antenna 7 by radio. In this case, an image to be distributed is displayed as the screen 17 on this display unit 6. An image to be transmitted from the side of a TV phone 24 is displayed on this display unit 6. In the meantime, in case of encoding and transmitting an image at real time, the encoded image does not have to be stored in the memory preliminarily.

A voice signal from a speaker 13 is encoded by a voice codec section 19 and transmitted to the transmission path 23 through the transmission controller 20 and the network interface 21. A system controller 22 controls the codec section 18 and the voice codec section 19, and the transmission controller 20 controls the system control section 22. The system controller 22 inputs various kinds of information through the operating section 4 such as the ten key.

In case where the transmission path 23 is the Internet, transmission band is secured like ISDN network and transmission speed is low (10–120 kbps) with jitters. Thus, a video signal and a voice signal are encoded by compression to one several hundredth and after that, multiplexed to a stream. Then, a buffer or the like is provided to compensate for band deviation so as to absorb the band deviation when distributing images.

An operation of the above described structure will be described below. Now, if it is intended to transmit his or her own face image and voice through the transmission path 23 to a terminal unit like a mating TV phone 24 by the mobile phone 1, the lid portion 3 shown in FIG. 2C is rotated by 180° and the display device 6 of the lid portion 3 is turned to the rear side of the case main body 2. Consequently, as shown in FIG. 5A, a picture of his or her face can be taken with the opening in the picture-taking camera 11 of the case main body 2 and the display device 6 of the lid portion 3 directed to himself or herself. Thus, he or she can take a picture of his or her face while seeing his or her own face displayed on the screen 17 of the display device 6 for monitoring.

When it is intended to take a picture of an object with the opening of the picture-taking camera 11 provided in the rear face directed to the object while the lid portion 3 is folded from the state shown in FIG. 2A toward the front side, gaining the state shown in FIG. 3A, it is possible to take picture while monitoring the display screen 17 in the display device 6.

Further, even in a state in which the lid portion 3 is kept open as shown in FIG. 2C, taking picture is enabled through the picture-taking camera 11 disposed on the rear face of the case main body 2 so that the object can be monitored through the display device 6. In this case, the display device 6 is used as a monitor screen for various operations for communication, image transmission, E-mail and the like with the mobile phone 1.

Although with the above described structure, a case where the picture-taking camera 11 is provided on the top of the rear face of the case main body 2 has been described, the mounting position of the picture-taking camera 11 is not restricted to the top of the rear face but it may be disposed at any appropriate position on the rear face.

As shown in FIG. 5B, if the opening of the picture-taking camera 11 is disposed at any appropriate position on the side face of the case main body 2, this mobile phone 1 is suitable for a case of taking a picture of himself or herself as well as taking a picture of an outside object while monitoring the display screen with the lid portion 3 turned to see the display screen.

When taking a picture of an outside object with the picture-taking camera 11, it is permissible to activate the picture-taking camera 11 by selecting a picture taking mode from the menu screen with the jog dial 14. That is, if the picture taking mode is selected to activate the camera with the menu screen displayed on the display device 6 of the mobile phone 1, the picture-taking camera 11 is so controlled to be started by the system controller 22. Only by selecting the picture taking mode through the menu, the outside object cannot be taken picture of. Actually, by directing the picture-taking camera 11 to the object in picture taking mode and then pressing the jog dial 14, the outside object can be taken picture of. Although a picture is taken by pressing the jog dial, it is permissible to taken picture of the object by pressing one of the ten key 4 or it is permissible to provide a shutter button designated for taking picture.

A taken image is inputted to the image codec section 18. The inputted image is encoded in the image codec section 18 and stored in an internal memory (not shown). If it is intended to transmit such stored, encoded image to the outside, an image transmission mode is selected from the menu screen displayed on the display device 6 with the jog dial 14 and determined. In the image transmission mode, user selects an image desired to be transmitted. Then, a transmission destination (for example, telephone number) is specified by a user and the selected image (encoded image data) is transmitted to the transmission destination through the network interface 21 and the transmission path 23. When selecting an image desired to be transmitted, it is permissible to select a transmission image while that image is displayed on the display device 6. In this case, by selecting a number displayed on the menu, attached to each image using the jog dial, an encoded image corresponding to the selected number is read out from the internal memory of the codec section 18, decoded and displayed on display device 6. It is permissible to input an image title using the jog dial 14 and ten keys 4 when taking a picture of the image, encode it and store it in the memory. Consequently, user can select an image desired to be transmitted more easily than when selecting a desired image according to its image number.

In the portable terminal unit like the mobile phone of the present invention, the display device disposed in the lid portion is constructed to be foldable and rotatable freely with the picture taking camera fixed in the case main body. Thus, by rotating or folding the lid portion corresponding to his or her own image or an image of an outside object taken with the picture taking camera, user can monitor that image with the display device in a state suitable for taking picture. Further, reduction of the size thereof is achieved, so that a portable terminal unit convenient for carrying can be provided.

While the best mode for carrying out the invention has been described in detail, those familiar with the art to which the invention relates would recognize various alternative designs and embodiments for practicing the invention. These alternative embodiments are within the scope of the present invention. Accordingly, the scope of the present invention embodies the scope of the claims appended hereto.

What is claimed is:

1. A portable terminal unit comprising:
   a case main body;
   a lid portion foldable in a first rotational direction through a hinge portion with respect to said case main body, wherein said lid portion is rotatably installed by said hinge portion on said case main body in a second rotational direction intersecting perpendicularly with said first rotational direction;
   a picture taking device located on a rear face of said case main body; and
   a display provided on a rear face of said lid portion for displaying a picture taken by said picture taking device,
   wherein said picture taking device and said display are located on a same face of the portable terminal unit by rotating said lid in said second rotational direction while said case main body and said lid portion are opened with an angle therebetween, and
   wherein when said lid is rotated in said first rotation direction said lid and said case main body are substantially in a same plane, a user can monitor on the display a self portrait being taken by said picture taking device.

2. The portable terminal unit according to claim 1, wherein said picture taking device is located on a rear face of a flat portion of said case main body.

3. The portable terminal unit according to claim 1 further comprising:
   an operating device for selecting a menu item by moving a cursor on a menu displayed on said display, wherein said menu item is selected by pressing the operating device, and wherein
   a picture taking mode for taking a picture is selected by operating said operating device and a picture is taken with said picture taking device by pressing said operating device.

4. The portable terminal unit according to claim 3 further comprising an image encoding/decoding device for encoding a taken picture to generate an encoded image.

5. The portable terminal unit according to claim 4 further comprising a data transmitting device for transmitting said encoded image.

6. The portable terminal unit according to claim 3 further comprising an image encoding/decoding device for encoding a taken picture to generate an encoded image and storing said encoded image in a memory.

7. The portable terminal unit according to claim 6, wherein an image to be transmitted is selected by operating said operating device.

8. The portable terminal unit according to claim 7, wherein the image selected by operating said operating device is displayed on said display prior to transmission.

9. The portable terminal unit according to claim 8, wherein the image selected by operating said operating device is read out from said memory as an encoded image encoded by said encoding/decoding device and a decoded image is displayed on said display after decoding said encoded image.

* * * * *